United States Patent
Truscott et al.

(10) Patent No.: US 9,931,779 B2
(45) Date of Patent: Apr. 3, 2018

(54) EXTRUSION DIE HAVING ADJUSTABLE END SEAL SYSTEM AND METHOD OF USE

(71) Applicant: Nordson Corporation, Westlake, OH (US)

(72) Inventors: Michael K. Truscott, Chippewa Falls, WI (US); Dale P. Pitsch, Jim Falls, WI (US)

(73) Assignee: Nordson Corporation, Westlake, OH (US)

( * ) Notice: Subject to any disclaimer, the term of this patent is extended or adjusted under 35 U.S.C. 154(b) by 323 days.

(21) Appl. No.: 14/658,658

(22) Filed: Mar. 16, 2015

(65) Prior Publication Data

US 2016/0271853 A1 Sep. 22, 2016

(51) Int. Cl.
*B29C 47/08* (2006.01)
*B29C 47/00* (2006.01)
*B29C 47/14* (2006.01)

(52) U.S. Cl.
CPC ...... *B29C 47/0871* (2013.01); *B29C 47/0019* (2013.01); *B29C 47/0021* (2013.01); *B29C 47/0806* (2013.01); *B29C 47/0808* (2013.01); *B29C 47/14* (2013.01)

(58) Field of Classification Search
CPC ............ B29C 47/0871; B29C 47/0019; B29C 47/0021; B29C 47/0808; B29C 47/14; B29C 47/0806
USPC ............. 264/39, 165, 171.21, 172.1, 172.12, 264/173.16, 177.13; 425/110, 113
See application file for complete search history.

(56) References Cited

U.S. PATENT DOCUMENTS

| | | | |
|---|---|---|---|
| 2,387,718 A | 10/1945 | Coleman et al. | |
| 2,963,741 A | 12/1960 | Longstreth et al. | |
| 3,382,537 A | 5/1968 | Tigner | |
| 3,813,204 A | 5/1974 | Gregory | |
| 3,829,274 A | 8/1974 | Melead | |
| 4,753,587 A | 6/1988 | Djordjevic et al. | |
| 4,990,079 A | 2/1991 | Lorenz | |
| 5,424,018 A * | 6/1995 | Paul ................... | B29C 47/0021 264/176.1 |

(Continued)

FOREIGN PATENT DOCUMENTS

JP 2002192594 A 7/2002

OTHER PUBLICATIONS

Unpublished U.S. Appl. No. 141627,489 entitled "System and Method for Adjusting the Land Length on an Extrusion Die" filed Feb. 20, 2015, 32 pages.

(Continued)

*Primary Examiner* — Matthew J Daniels
*Assistant Examiner* — Leith S Shafi
(74) *Attorney, Agent, or Firm* — Baker & Hostetler LLP

(57) ABSTRACT

An extrusion die is provided with an adjustable end seal assembly. The extrusion die includes a die body, and the adjustable end seal assembly includes an end seal device and a wedge mechanism. The adjustable end seal assembly has an engaged configuration and a disengaged configuration. When in the engaged configuration, the adjustable end seal assembly is held forcibly against the die body. When in the disengaged configuration, the adjustable end seal assembly is either spaced apart from the die body or held against the die body with less force than when in the engaged configuration. Methods of operating such an extrusion die are also provided.

15 Claims, 8 Drawing Sheets

(56) References Cited

U.S. PATENT DOCUMENTS

| | | | |
|---|---|---|---|
| 5,639,305 A | 6/1997 | Brown et al. | |
| 6,287,105 B1 * | 9/2001 | Druschel | B29C 47/165 |
| | | | 425/190 |
| 7,074,030 B2 * | 7/2006 | Ulcej | B29C 47/0021 |
| | | | 425/226 |
| 7,296,991 B2 | 11/2007 | Irwin | |
| 8,777,605 B2 | 7/2014 | Ulcej et al. | |
| 8,858,211 B2 | 10/2014 | Fraley | |
| 2002/0036362 A1 | 3/2002 | Chigira et al. | |
| 2013/0122131 A1 * | 5/2013 | Sedivy | B29C 47/0816 |
| | | | 425/150 |

OTHER PUBLICATIONS

European Application No. 16157506.3: Extended European Search Report dated Aug. 12, 2016, 9 pages.

* cited by examiner

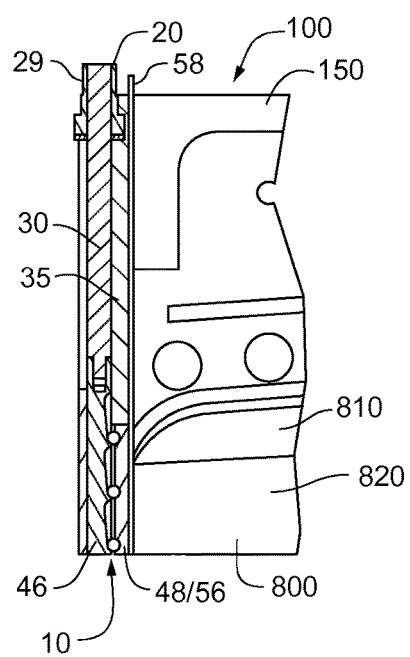
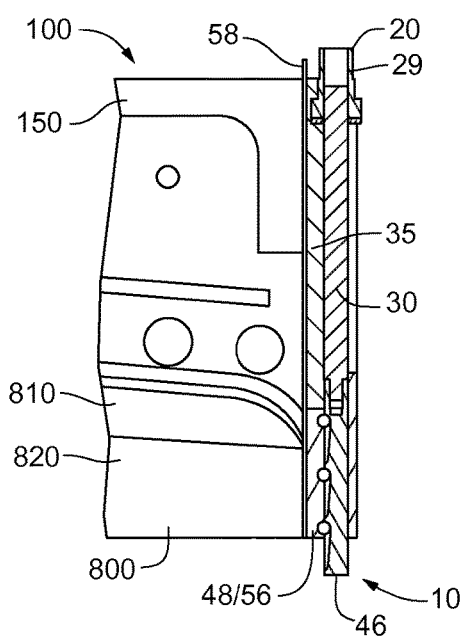
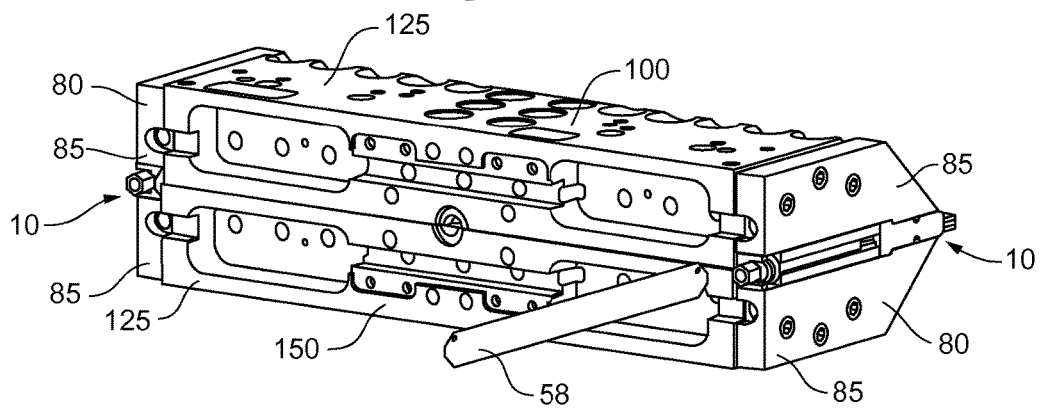

EXTRUSION DIE HAVING ADJUSTABLE END SEAL SYSTEM AND METHOD OF USE

FIELD OF THE INVENTION

The present invention relates generally to extrusion dies. More specifically, this invention relates to the end seals of an extrusion die.

BACKGROUND OF THE INVENTION

Extrusion dies are widely used for extruding sheets of polymer. These dies have an internal flow passageway through which polymer flows on its way to an outlet orifice. The extrudate leaves the die through the outlet orifice. Two end seals are provided to close the lateral sides of the internal flow passageway. Typically, each end seal is sandwiched between an end of the die and an end plate secured thereto. In the past, some end seals have been tightened against the end of the die by individually advancing each of a series of threaded screws. The leading ends of the screws then push the end seal more firmly against the end of the die.

This approach has some drawbacks and limitations. For example, to firmly clamp such an end seal against the end of a die, it is necessary to separately manipulate each of a series of different screws. Moreover, getting all the screws tightened to the same degree requires a certain amount of time, effort, and/or expertise.

It would be desirable to provide an end seal adjustment system that can simultaneously apply substantially uniform pressure to multiple points about the area of an end seal. It would also be desirable to provide an end seal adjustment system that provides single point adjustment of the entire area of an end seal. Further, it would be desirable to provide an end seal adjustment system that can be installed on, and removed from, an extrusion die quickly and easily.

BRIEF DESCRIPTION OF THE DRAWINGS

FIG. 12 is a cross-sectional detail view of the extrusion die and one of the adjustable end seal assemblies of FIG. 9, with that adjustable end seal assembly shown in an engaged configuration.

FIG. 13 is a cross-sectional view of the extrusion die and the other adjustable end seal assembly of FIG. 9, with that adjustable end seal assembly shown in a disengaged configuration.

FIG. 14 is a rear perspective view of the extrusion die and adjustable end seal assemblies of FIG. 9, with a gasket of one of the adjustable end seal assemblies shown exploded from the die.

SUMMARY OF THE INVENTION

Figure 1:
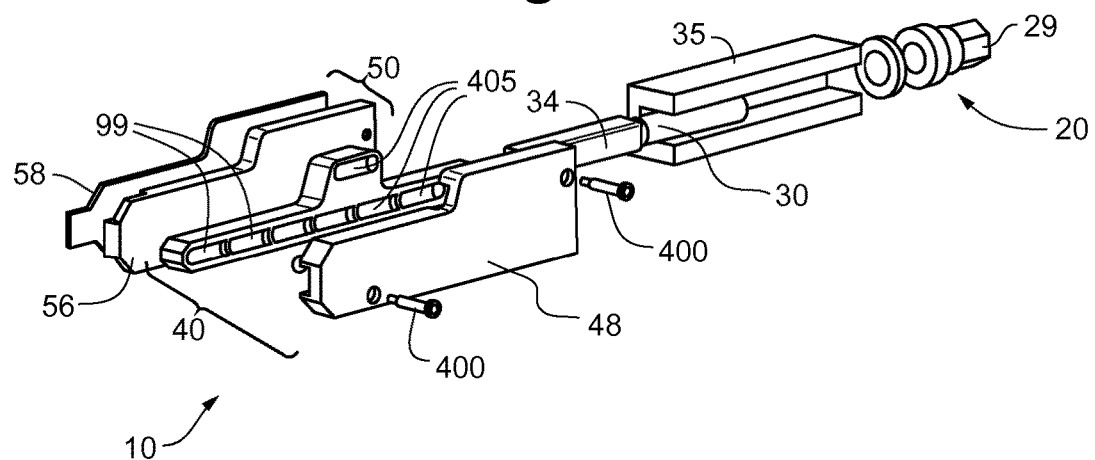
FIG. 1 is an exploded perspective view of an adjustable end seal assembly in accordance with one embodiment of the present invention.
Figure 2:
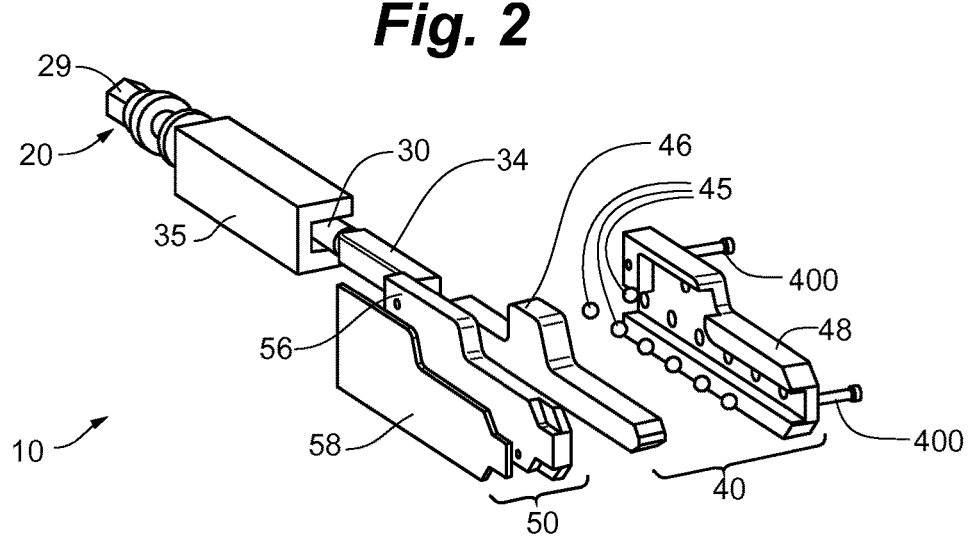
FIG. 2 is an exploded perspective view of the adjustable end seal assembly of FIG. 1, with the assembly shown from a different perspective than in FIG. 1.
Figure 3:
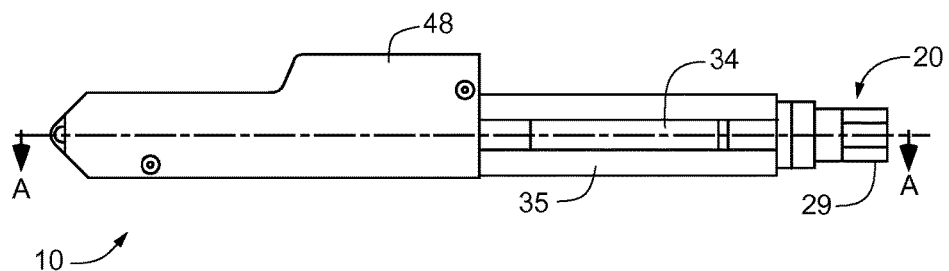
FIG. 3 is a side view of the adjustable end seal assembly of FIG. 1, with the assembly shown, in isolation, in an assembled state.

In one embodiment, the invention provides an extrusion die having a die body, an internal flow passageway, an outlet orifice, an adjustable end seal assembly, and an end plate. The die body has an end region to which the end plate is mounted. The die body includes two halves between which the internal flow passageway extends. The internal flow passageway leads to the outlet orifice. The adjustable end seal assembly includes an end seal device and a wedge mechanism. The end seal device closes one side of the internal flow passageway such that, when the extrusion die is operated, extrudate flows through the internal flow passageway and alongside the end seal device. The adjustable end seal assembly has an engaged configuration and a disengaged configuration. When the adjustable end seal assembly is in the engaged configuration, the end seal device is held forcibly against the end region of the die body. When the adjustable end seal assembly is in the disengaged configuration, the end seal device is either spaced apart from the end region of the die body or held against the end region of the die body with less force than when in the engaged configuration.

Another embodiment of the invention provides a method of operating an extrusion die having a die body with an end region, an internal flow passageway, and an adjustable end seal assembly having an end seal device and a single actuator. The method involves moving the adjustable end seal assembly from a disengaged configuration to an engaged configuration by operating the single actuator of the adjustable end seal assembly. When the adjustable end seal assembly is in the engaged configuration, the end seal device is held forcibly against an end region of the die body. When the adjustable end seal assembly is in the disengaged configuration, the end seal device is either spaced apart from the end region of the die body or held against the end region of the die body with less force than when in the engaged configuration.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples given have many useful alternatives, which fall within the scope of the invention.

The invention provides an adjustable end seal assembly for extrusion dies. The following disclosure begins by describing the adjustable end seal assembly itself, then describes an extrusion die equipped with the adjustable end seal assembly, and finally describes methods of using such an extrusion die.

FIGS. 1-5 show an embodiment of the adjustable end seal assembly 10. The assembly 10 includes a wedge mechanism 40 and an end seal device 50. The adjustable end seal assembly 10 is movable between an expanded profile and a contracted profile. When the illustrated assembly 10 is in its expanded profile, the wedge mechanism 40 and the end seal device 50 have a greater combined thickness 90 (see FIG. 4) than when the assembly is in its contracted profile. This can be appreciated by comparing FIG. 12, which shows the expanded profile of an end seal assembly 10, with FIG. 13, which shows the contracted profile of an end seal assembly. The thickness 90 preferably increases by at least 0.050 inch, such as 0.075 inch or more, in going from disengaged configuration to the engaged configuration. Thus, when the assembly 10 is in its expanded profile, the end seal device 50 is adapted to bear forcibly against an end region of an extrusion die so as to seal one lateral side of the die's internal flow passageway.

The adjustable end seal assembly has an actuator that is operable to move the assembly between its expanded profile and its contracted profile. The actuator preferably is a single-point actuator that enables an operator to move the assembly 10 between its fully expanded profile and its fully contracted profile by operating only a single actuator. In such cases, the assembly 10 moves between its expanded and contracted profiles in response to operation of a single actuator. In addition, the actuator preferably is constructed such that a person can operate it without having to disassemble any part of the adjustable end seal assembly 10.

In the illustrated embodiments, the actuator 20 is a rotatable actuator. When this actuator is rotated in one direction (e.g., clockwise), the adjustable end seal assembly 10 moves to its expanded profile. When this actuator is rotated in the opposite direction (e.g., counterclockwise), the adjustable end seal assembly 10 moves to its contracted profile. It is to be appreciated, however, that the actuator 20 is not required to be rotatable. For example, the actuator 20 can alternatively be a slide member that simply moves in a linear fashion, or a threaded rod that simultaneously rotates and moves axially. Other useful actuators will be apparent to skilled artisans given the present teaching as a guide.

Figure 4:
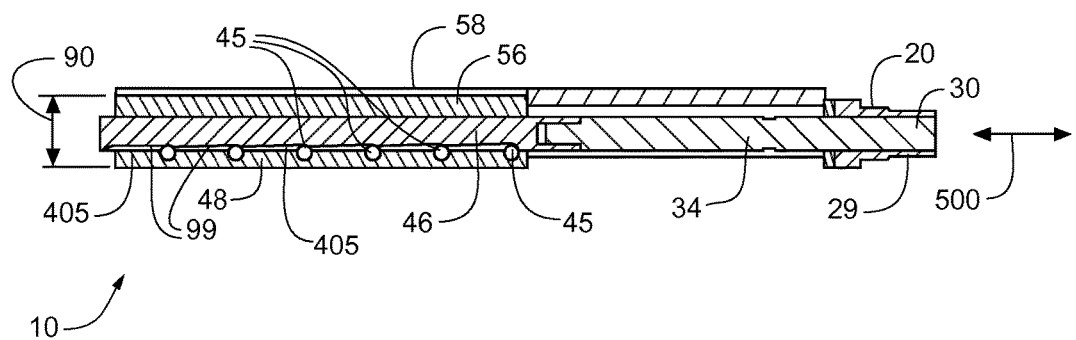
FIG. 4 is a cross sectional view of the adjustable end seal assembly of FIG. 3, with the cross section taken along lines A-A of FIG. 3.
Figure 5:
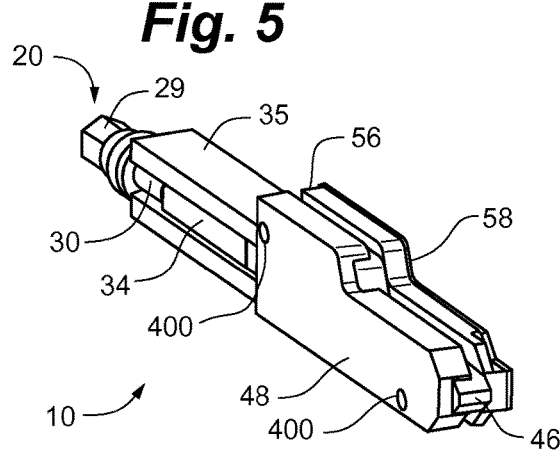
FIG. 5 is a perspective view of the adjustable end seal assembly of FIG. 1, with the assembly shown, in isolation, in an assembled state.

In FIGS. 1-5, the actuator 20 is operably coupled with an elongated, axially moveable adjustment rod 30. In this embodiment, the actuator 20 can be operated to move the adjustment rod 30 axially in first and second directions. The illustrated actuator 20 comprises a rotatable body that, when rotated in one direction (e.g., clockwise), causes the adjustment rod to move axially in the first direction, and when rotated in another direction (e.g., counterclockwise), causes the adjustment rod to move axially in the second direction. In FIG. 4, the first direction is to the right, and the second direction is to the left.

In the embodiments illustrated, the actuator 20 comprises a rotatable body threadingly coupled with the elongated adjustment rod 30. Referring to FIG. 4, the rotatable body is internally threaded, and the adjustment rod 30 is externally threaded. In the embodiment of FIGS. 1-5, the adjustment rod 30 has a polygonal portion 34, which is shown having a square cross section. This is perhaps best seen in FIGS. 1, 2, and 5. The polygonal portion 34 is provided to prevent rotation of the adjustment rod. In FIGS. 1-5, the adjustable end seal assembly 10 includes a guide (or "sleeve") 35 in which the adjustment rod 30 is received. The fit between the adjustment rod 30 and the guide 35 is such that the adjustment rod is allowed to move axially but is prevented from rotating about its axis. While the guide 35 is advantageous in some embodiments, it is not required. Instead, other means can be provided for preventing rotation of the adjustment rod 30. For example, a key projecting from the side of the adjustment rod can be received in an elongated recess track that is parallel to the axis of the rod. Other useful anti-rotation structures will be apparent to skilled artisans given the present teaching as a guide.

Thus, in the embodiment of FIGS. 1-5, by rotating the illustrated actuator 20, the adjustment rod 30 is forced to move axially. This happens by virtue of the threaded engagement between the rotating internally threaded actuator 20 and the non-rotating adjustment rod 30. In other embodiments, however, the rotatable actuator is omitted in favor of having an axially movable actuator, which may be an adjustment rod. In such embodiments, the adjustment rod may be prevented from rotating about its axis (e.g., it may simply move linearly) or it may simultaneously rotate and move axially.

In the embodiments illustrated, the adjustment rod 30 is operably coupled with a drive member 46 of the wedge mechanism 40. In response to axial movement of the adjustment rod 30 in a first direction, the drive member 46 moves in the same direction (i.e., in the first direction). In response to axial movement of the adjustment rod 30 in a second direction, the drive member 46 moves axially in the same direction (i.e., in the second direction). As shown in FIG. 4, the adjustment rod 30 is attached directly to the drive member 46 of the wedge mechanism 40. In this embodiment, a front end region of the adjustment rod 30 is attached (by a threaded attachment) to a rear end region of the drive member 46. The adjustment rod and the drive member are thus adapted to move together as a unit.

If so desired, the adjustment rod can be attached indirectly (e.g., via one or more intermediate components) to the drive member. Alternatively, the adjustment rod can be an integral extension of the drive member.

In operation, axial movement of the adjustment rod 30 forces the drive member 46 to move in the same direction as the adjustment rod. In addition to the drive member 46, the illustrated wedge mechanism 40 includes a side member 48 and a plurality of cam members 45. When provided, the cam members 45 are located between the drive member 46 and the side member 48. In the embodiments illustrated, either the drive member 46 or the side member 48 has a series of wedge surfaces 99, which cam with (and/or roll over) respective cam members 45 during relative movement of the drive member 46 and the side member 48. Due to the inclined (or "ramped") configuration of each wedge surface 99, the resulting camming and/or rolling action moves the end seal device 50 between retracted and extended positions. Thus, the end seal device 50 has a retracted position (shown in FIG. 13) and an extended position (shown in FIG. 12).

In the embodiments illustrated, either the drive member 46 or the side member 48 has a series of spaced apart grooves 405. This is perhaps best shown in FIGS. 1 and 4. Each of these grooves 405 has a first end and a second end. The second end of each groove 405 is deeper than the first end, and the wedge surfaces 99 are at the bottoms of the grooves 405. In more detail, each illustrated groove 405 is relatively shallow at one end and relatively deep at the other end, such that an inclined surface defining the bottom of each groove 405 forms the wedge surface 99. In embodiments of this nature, the cam members 45 can advantageously be spheres received in respective grooves 405. Thus, the illustrated cam members 45 each comprise a sphere, such as a ball bearing, that is received in one of the grooves 405. As shown in FIG. 4, the bottom surface of each illustrated groove 405 defines an elongated, inclined track that rides on a sphere received in that groove during relative movement of the drive member 46 and the side member 48.

Thus, in the embodiment of FIGS. 1-5, when the drive member 46 moves in the first direction relative to the side member 48, the spheres start-out in the deep ends of the grooves 405 and end-up in the shallow ends of the grooves. During this movement, the wedge surfaces 99 cam with (and/or roll over) the respective spheres. This camming action moves the end seal device 50 to its extended position (see FIG. 12). On the other hand, when the drive member 46 moves in the second direction relative to the side member 48, the spheres start-out in the shallow ends of the grooves 405 and end-up in the deep ends of the grooves. This moves the end seal device 50 to its retracted position (see FIG. 13).

If so desired, each groove 405 can have a depth change of at least 0.005 inch over a 1 inch length. The depth change per inch of groove length can optionally be, for example, about 0.008. Thus, for a groove length of 1.25 inches, the groove depth change over that length may be 0.01 inch. It is to be appreciated that these details are by no means limiting. Rather, the depth change can be varied to accommodate different applications.

The adjustment rod can alternatively be provided as an externally threaded bolt. For example, an externally threaded bolt can be attached to the drive member such that the bolt is free to rotate about its axis relative to the drive member, while a non-rotatable internally threaded member is threadingly coupled to the bolt. In such cases, rotating the externally threaded bolt causes the above-noted wedging action, forcing the drive member 46 to move relative to the side member 48, hence causing the wedge surfaces 99 to cam with, and/or roll over, the cam members. Due to the inclined configuration of the wedge surfaces, this results in the end seal device 50 moving between its retracted and extended positions.

In the embodiment of FIGS. 1-5, the wedge surfaces 99 are on the drive member 46. As noted above, however, this is not required. For example, the wedge surfaces can alternatively be on the side member. Thus, depending on whether the wedge surfaces 99 are on the drive member 46 or on the side member 48, the wedge surfaces may move relative to the cam members 45, or the cam members may move relative to the wedge surfaces.

In the embodiments illustrated, the wedge mechanism 40 includes the drive member 46, the side member 48, and a plurality of camming members 45. The camming members 45 are shown as spheres (e.g., ball bearings). As an alternative, the camming members can be cylinders (e.g., pins) against which wedge surfaces of the drive member or side member cam (and/or roll) during relative movement of the drive member and the side member. In other embodiments, the camming members are omitted, and the camming action is simply provided by oppositely tapered wedge surfaces on the drive member and the side member.

In the embodiment of FIGS. 1-5, the wedge mechanism 40 includes a drive member 46 and a side member 48, while the end seal device 50 includes an end seal plate 56 and a gasket 58. In this embodiment, the drive member 46 is located between the side member 48 and the end seal plate 56. In other embodiments, the end seal plate 56 itself can also serve as the side member. This is the case in the embodiment of FIGS. 8-14, and in the embodiment of FIGS. 15-18.

The end seal plate 56 preferably is a rigid (e.g., metal) plate, beam, or block. It may be formed of steel, such as P20 tool steel. The gasket 58 preferably is formed of a high temperature gasket material, such as PTFE with barium sulfate filler (which is sold under the trade mark Gylon), stainless steel, or aluminum. The selection of a particular gasket material will depend upon the configuration of the die to be used, the intended processes, etc.

In the embodiments of FIGS. 1-5, the adjustable end seal assembly 10 can be inserted into, and removed from, its mount on an extrusion die 100 as a single, integral unit. The same is true of the embodiment shown in FIGS. 8-14. This is perhaps best appreciated by referring to FIG. 8. Thus, in some embodiments, the adjustable end seal assembly 10 is constructed as a cartridge that can be moved (e.g., slid), as a single unit, into and out of an opening (e.g., a slot 900) delineated collectively by the extrusion die 100 and an end plate 80. These embodiments provide for particularly quick and easy installation and removal of the adjustable end seal assembly 10.

In the embodiment of FIGS. 1-5, the side member 48 and the end seal plate 56 are prevented from moving axially relative to each other. This is done by mounting two cross pins 400 in aligned bores passing through the end seal plate and the side member. Reference is made to FIGS. 1-3 and 5. The end seal plate 56 is allowed to slide a limited lateral distance along these pins 400, i.e., toward and away from the side member 48. As noted above, the drive member 46 in this embodiment is located between the side member 48 and the end seal plate 56. The two cross pins 400, however, do not pass through the drive member 46. Rather, the drive member 46 is allowed to move axially (i.e., in either direction of arrow 500 in FIG. 4) a limited distance relative to the side member 48 and the end seal plate 56.

Figure 7:
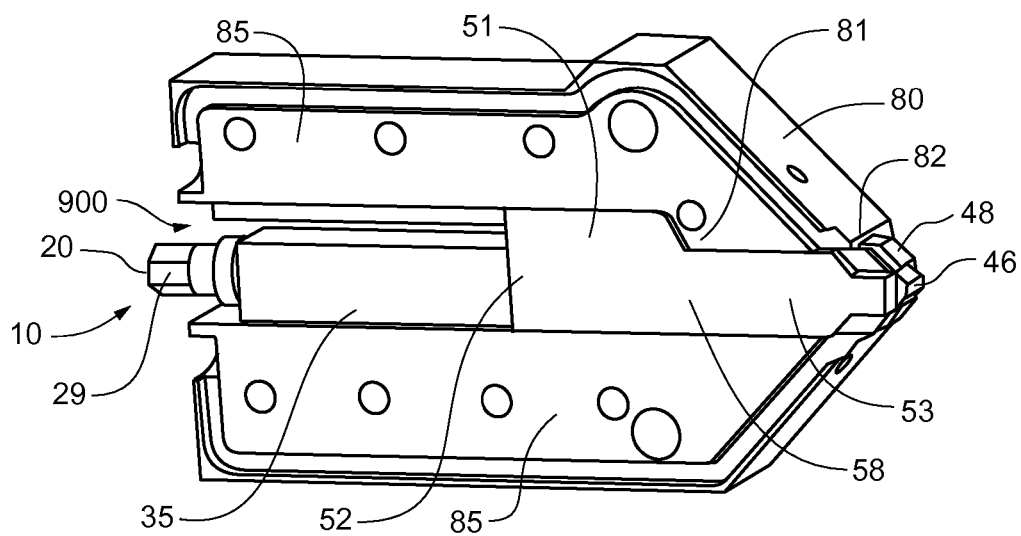
FIG. 7 is a perspective view of the end plate and adjustable end seal assembly of FIG. 6, showing a die-facing side of the end plate and adjustable end seal assembly.
Figure 8:
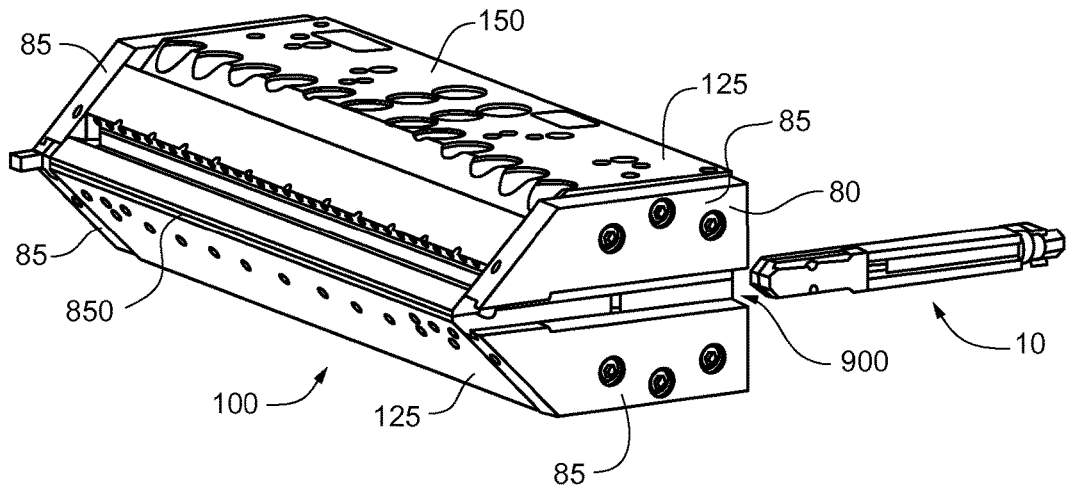
FIG. 8 is a front perspective view of an extrusion die and two adjustable end seal assemblies in accordance with another embodiment of the invention, with one of the adjustable end seal assemblies shown exploded from the die.

The adjustable end seal assembly 10 in the embodiment of FIGS. 1-5 is designed for use on an extrusion die 100 having a restrictor bar. The end seal device 50 is therefore shaped to seal the area adjacent the restrictor bar. Referring to FIG. 7, it can be appreciated that the end seal device 50 has a trailing region 52 and a leading region 53, and the trailing region is wider than the leading region. The trailing region 52 includes a shoulder area 51 configured to seal the area adjacent the restrictor bar. The illustrated gasket 58 and end seal plate 56 are also shaped in this manner (e.g., each have the same type of trailing region 52 and leading region 53).

A non-limiting method of making an adjustable end seal assembly will now be described. The end seal gasket is cut out in a shape to cover any flow opening at the end of the die. A solid metal push plate, i.e., the end seal plate (used to push the gasket against the end of the die), is cut in the same shape as the gasket. The drive member (which may be a drive plate) has an inclined plane machined into one side. The push plate (i.e., the end seal plate) is machined to accept a component that rides in the inclined plane, so as to spread the assembly and thereby apply pressure to the end of the die. The drive member is driven with a contained threaded spool, which will move the drive member in a linear motion. The components are held together with a shoulder bolt to allow the components to spread and contain the components that ride in the inclined plane. Given the present teaching as a guide, skilled artisans will appreciate that the adjustable end seal assembly can be made by other methods.

The invention also provides embodiments involving an extrusion die 100 equipped with an adjustable end seal assembly 10. Reference is made to FIGS. 6-18. The extrusion die 100 has a die body 150, an internal flow passageway 800, and an outlet orifice 850. The internal flow passageway 800 leads to the outlet orifice 850.

The internal flow passageway 800 of the extrusion die 100 will commonly include a manifold 810, a preland channel and a final land channel 820. Reference is made to FIGS. 12 and 13. In these figures, the interface of the preland, secondary, and land are not shown. It is to be appreciated that the internal flow passageway need not include all of these sections. Rather, the internal flow passageway can be provided in various different forms, e.g., based on the extrusion processes the die is intended to carry out.

Figure 10:
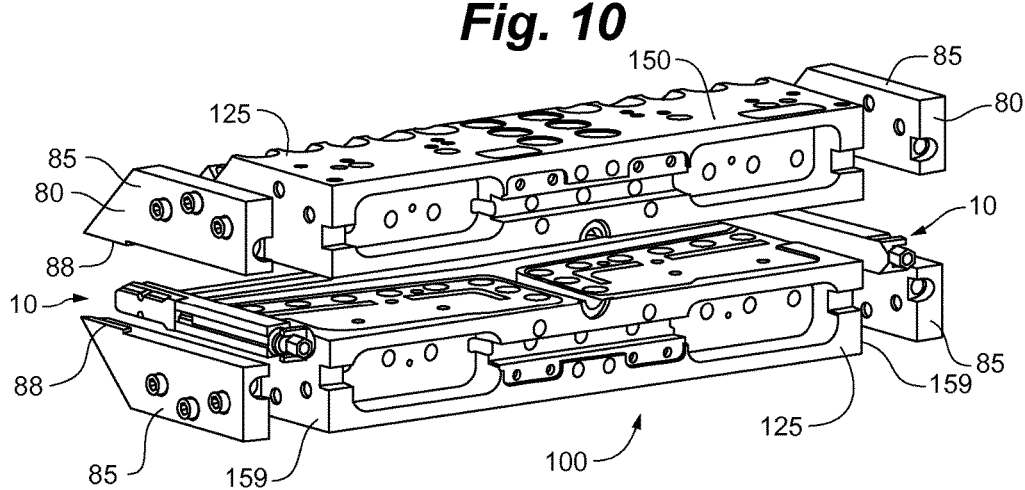
FIG. 10 is a partially exploded rear perspective view of the extrusion die and adjustable end seal assemblies of FIG. 9.
Figure 11:
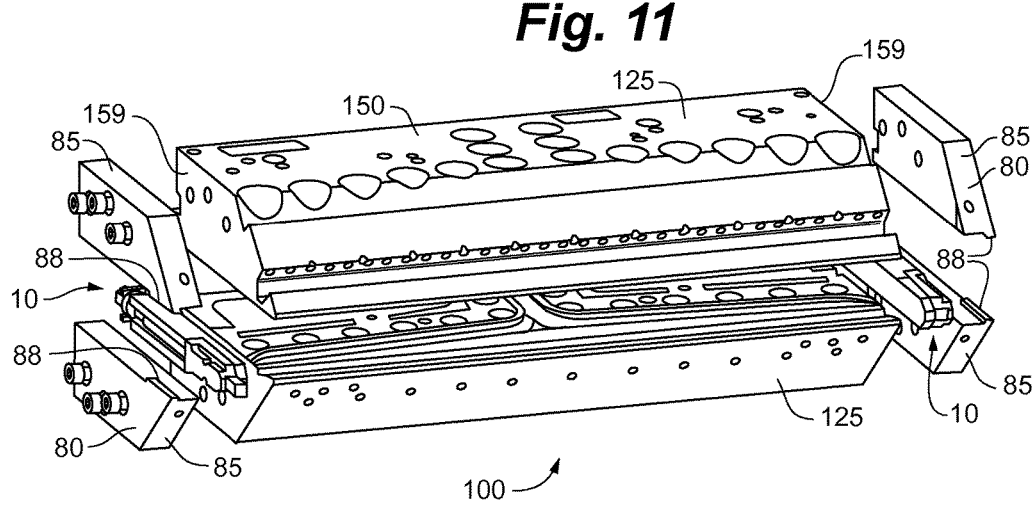
FIG. 11 is a partially exploded front perspective view of the extrusion die and adjustable end seal assemblies of FIG. 9.

In the embodiments illustrated, the die body 150 includes two halves 125 between which the internal flow passageway 800 extends. Each illustrated half 125 of the die body 150 comprises a block having machined therein half of the internal flow passageway. Thus, when the two halves 125 of the die body 150 are joined together, the mating recesses in the confronting faces of these blocks collectively form the internal flow passageway. This is shown in FIGS. 10 and 11.

The die 100 can be provided in a variety of different forms, as will be appreciated by those skilled in this field. Thus, the adjustable end seal assembly 10 can be used with a variety of different dies; the basic style of the die itself is not limiting to the invention.

In the present embodiments, the adjustable end seal assembly 10 includes an end seal device 50 and a wedge mechanism 40. The end seal device 50 closes (and when the illustrated assembly 10 is in an engaged configuration, seals) one lateral side of the internal flow passageway 800. Thus, when the extrusion die 100 is operated, polymer or another extrudate flows through the internal flow passageway 800 and alongside the end seal device 50. For example, extrudate flowing through the die 100 contacts the end seal device 50 as it flows downstream toward the outlet orifice 850. As noted above, the end seal device 20 preferably comprises a gasket 58 positioned between an end region 159 of the die body 150 and the wedge mechanism 40. In such cases, when the extrusion die 100 is operated, polymer or another extrudate flowing through the internal flow passageway 800 contacts the gasket 58 (e.g., at locations upstream from the outlet orifice).

Figure 6:
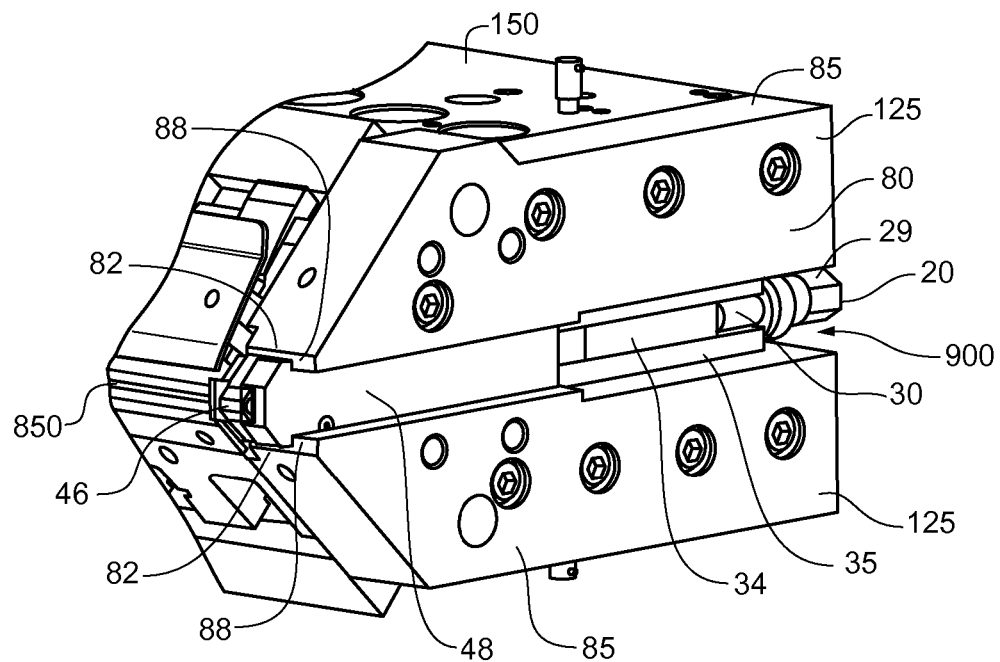
FIG. 6 is a broken-away, front perspective view of an extrusion die equipped with the adjustable end seal assembly of FIG. 1.
Figure 15:
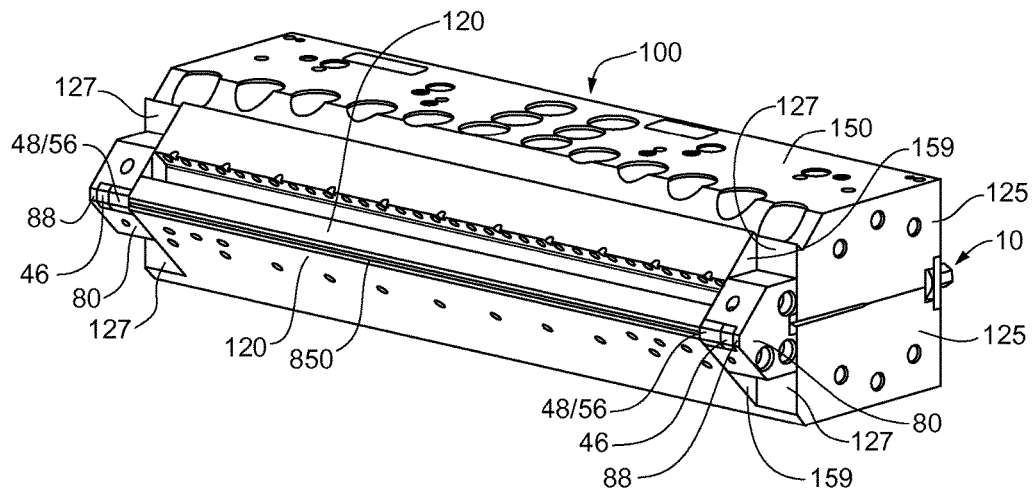
FIG. 15 is a front perspective view of an extrusion die and two adjustable end seal assemblies in accordance with still another embodiment of the invention.
Figure 16:
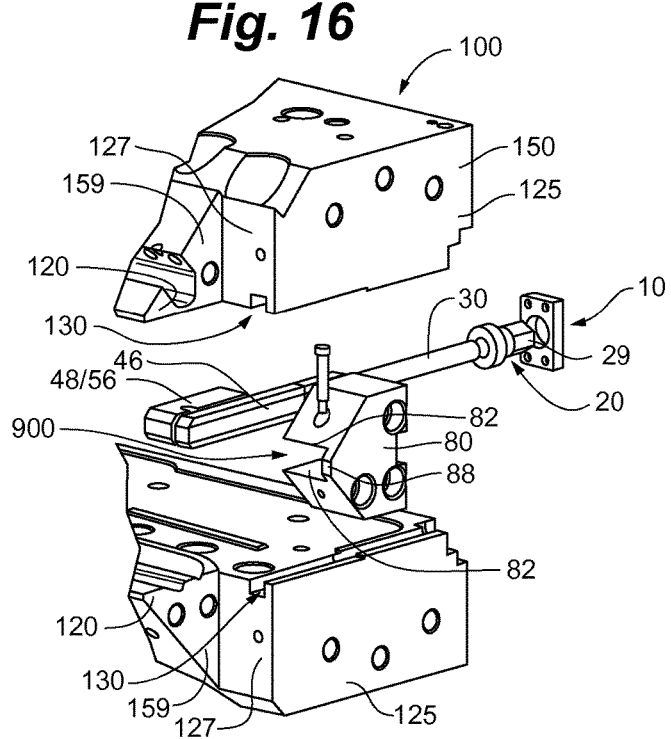
FIG. 16 is an exploded, broken-way, front perspective detail view of the extrusion die and one of the adjustable end seal assemblies of FIG. 15.
Figure 17:
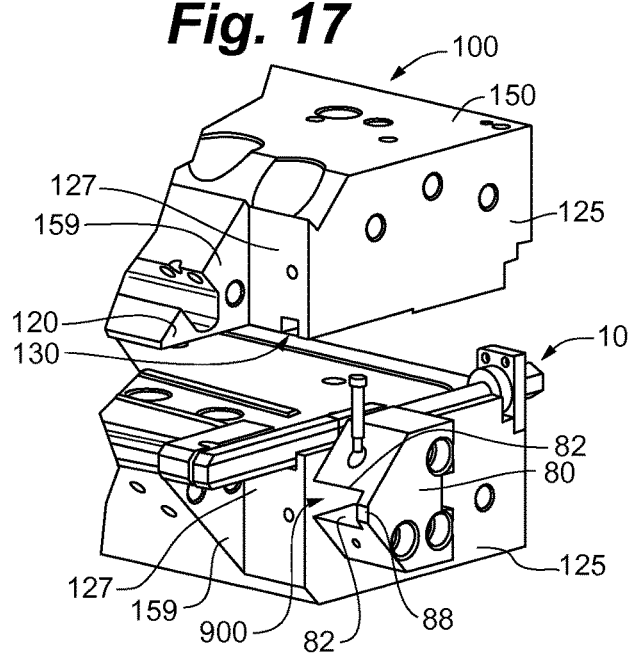
FIG. 17 is another exploded, broken-way, front perspective detail view of the extrusion die and one of the adjustable end seal assemblies of FIG. 15.
Figure 18:
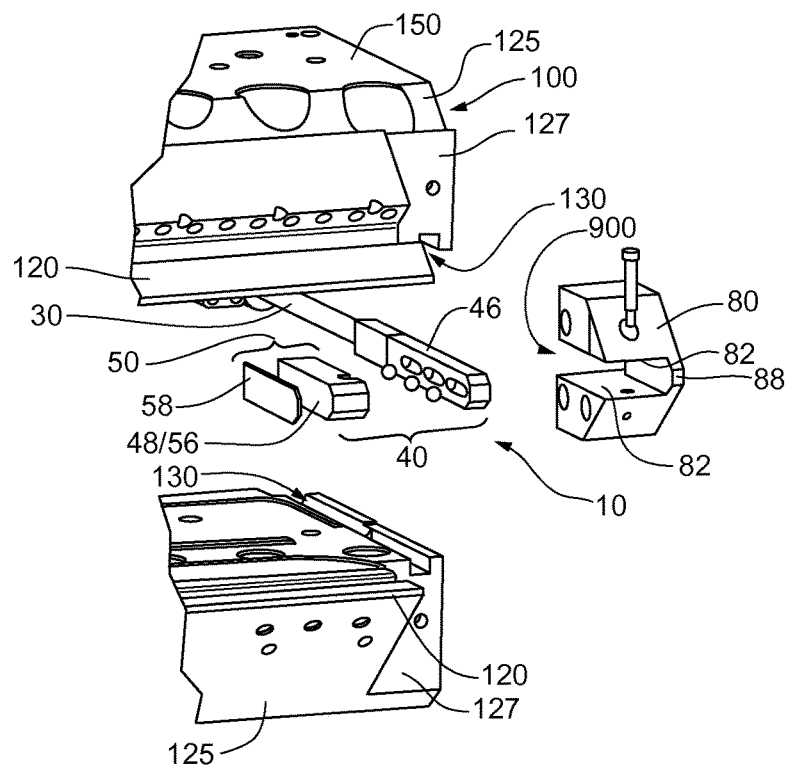
FIG. 18 is still another exploded, broken-way, front perspective detail view of the extrusion die and one of the adjustable end seal assemblies of FIG. 15.

The illustrated extrusion dies 100 each have opposed first and second lateral sides. FIG. 6 shows one lateral side (the right side, as seen in FIG. 6) of an extrusion die 100 in accordance with one embodiment of the invention. FIGS. 16-18 show one lateral side (the right side, as seen in these figures) of an extrusion die 100 in accordance with another embodiment of the invention. Skilled artisans will appreciate that the die 100 typically has two opposed lateral sides each with its own end plate 80. This is shown, for example, in FIGS. 8-11. Also, FIG. 15 shows that both lateral sides of the extrusion die 100 in FIGS. 16-17 have end plates 80, each with its own adjustable end seal assembly 10. While this will commonly be the case, it is not required. For example, one of the lateral die sides can have an adjustable end seal assembly while the other lateral die side has a conventional end seal.

In embodiments where the die 100 has two lateral sides each with its own adjustable end seal assembly 10, the two end seal devices 50 of the assemblies 10 respectfully close (and when both assemblies are in an engaged configuration, respectfully seal) the two lateral sides of the internal flow passageway 800. It will be understood that, in such embodiments, the two adjustable end seal assemblies 10 are on opposite lateral sides of the die 100, while the outlet orifice 850 is on a front side of the die and extends between the two lateral sides of the die.

In the present disclosure, when the details of a single adjustable end seal assembly 10 are described, it is to be appreciated that those details apply equally well for each such assembly in cases where both lateral sides of the extrusion die 100 have adjustable end seal assemblies. The same is true of the end plate discussions and other discussions of components that are, or may be, present at each lateral side of the extrusion die.

The extrusion die 100 has opposed front and rear sides. As noted above, the outlet orifice 850 is on the front side of the die 100. In some embodiments, when the adjustable end seal assembly 10 is in a disengaged configuration, a gasket 58 of the assembly is received loosely alongside the die body 150 (e.g., between the die body and an end seal plate 56 of the assembly 10) such that the gasket can be removed from the die 100 by simply pulling the gasket away from the rear side of the die. This can be appreciated by referring to FIG. 14, where the gasket 58 is shown exploded from the die 100 in a position it would occupy after being pulled from the die by an operator. The gasket can optionally have a small hole that can be hooked with a small wire or another similar tool. In this manner, the gasket can be easily pulled out of its position between the die 100 and the end seal plate 56. The gasket 58 in FIG. 14, for example, has one such hole near each of its two ends.

The adjustable end seal assembly 10 has an engaged configuration and a disengaged configuration. When the assembly 10 is in the engaged configuration, its end seal device 50 is held forcibly against an end region 159 of the die body 150. When the adjustable end seal assembly 10 is in the disengaged configuration, its end seal device 50 is either spaced apart from the end region 159 of the die body 150 or held against the end region of the die body with less force than when in the engaged configuration. Reference is made to FIGS. 12 and 13. The engaged configuration is shown in FIG. 12, and the disengaged configuration is shown in FIG. 13.

Preferably, when the adjustable end seal assembly 10 is in the engaged configuration, its end seal device 50 delivers a pressure of at least 15,000 pounds per square inch (psi) to the end region 159 of the die body 150. In preferred embodiments, the pressure is 20,000 psi or greater. The amount of applied pressure, however, can be lesser or greater (e.g., depending upon the particular die and end seal configurations and the processes to be performed) as required to eliminate or minimize extrudate leakage from the lateral sides of the internal flow passageway 850.

As noted above, the adjustable end seal assembly 10 preferably has a single-point actuator. In such cases, an operator can move the assembly 10 between the engaged and disengaged configurations by operating a single actuator. In addition, the actuator 20 and the die 100 preferably are constructed such that a person can operate the actuator without having to disassemble any part of the adjustable end seal assembly 10 or the extrusion die.

In the illustrated embodiments, the adjustable end seal assembly 10 has an actuator 20 on the rear side of the die 100. This actuator 20 is operable to move the adjustable end seal assembly 10 between the engaged and disengaged configurations. Various actuator options have been described.

As noted above, the adjustable end seal assembly 10 includes a wedge mechanism 40 comprising both a drive member 46 and a side member 48. The illustrated assembly 10 includes an elongated adjustment bar 30 extending from the actuator 20 on the rear side of the extrusion die 100 to the drive member 46. In the illustrated embodiments, the adjustment bar 30 spans more than 30% of the total length of the assembly 10. This is shown in FIG. 4. As discussed previously, the illustrated adjustment bar 30 moves axially in response to operation of the actuator 20. The drive member 46 and the side member 48 move away from each other in response to axial movement of the adjustment bar 30 in a first direction.

In alternate embodiments, rather than having the actuator on the rear of the die, it can be on a lateral side of the die (e.g., on the end plate). In such cases, an adjustment bar may extend from the end plate to the drive member. There may be, for example, a camming connection between an adjustment bar of this nature and a drive member. In such cases, moving the adjustment bar further into the die may cause a camming action that forces the drive member to move toward the front of the die, whereas moving the adjustment bar in the opposite direction forces the drive plate to move toward the rear of the die. Various other side-mounted actuator systems can also be used.

Figure 9:
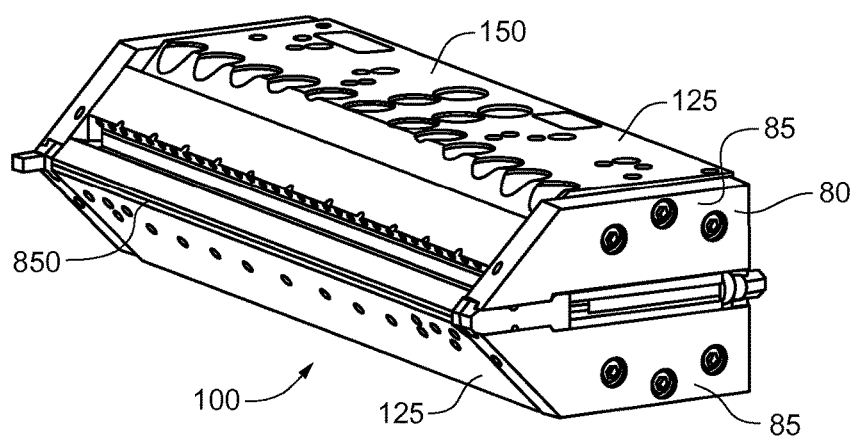
FIG. 9 is a front perspective view of the extrusion die and adjustable end seal assemblies of FIG. 8, with both adjustable end seal assemblies mounted operatively on the extrusion die.

In the embodiments of FIGS. 6-18, the adjustable end seal assembly 10 is housed in an end plate 80. With respect to the embodiment of FIGS. 6 and 7, this is perhaps best shown in FIG. 7. With respect to the embodiment of FIGS. 8-14, this is best shown in FIG. 9. With respect to the embodiment of FIGS. 15-18, this is best shown in FIG. 15. In these embodiments, the end plate 80 has a slot 900 in which the adjustable end seal assembly 10 is mounted. The end plate 80 has spaced-apart confronting first and second wall sections 82 between which the slot 900 is located. Reference is made to FIGS. 6 and 16.

In FIGS. 6-18, the adjustable end seal assembly 10 can be inserted into, and removed from, the slot 900 as a single unit. Preferably, this can be done by simply sliding the adjustable end seal assembly 10 into the slot 900, and later sliding it out of the slot. This is perhaps best appreciated by referring to FIGS. 8 and 9.

The adjustable end seal assembly 10 has an expanded profile when in the engaged configuration and a contracted profile when in the disengaged configuration. In the embodiments illustrated, the end plate 80 has a stop wall 88 that restrains (e.g., prevents) movement of the adjustable end seal assembly 10 in a lateral direction away from the die body 150. Thus, when the adjustable end seal assembly 10 expands in moving from the disengaged configuration to the engaged configuration, the stop wall 88 of the end plate 80 bears against the assembly 10, thereby limiting (e.g., preventing) its movement laterally away from the die 100 and hence forcing the assembly 10 to expand in the direction of the die. In connection with the embodiment of FIGS. 6 and 7, this is best shown in FIG. 6. In connection with the embodiment of FIGS. 8-14, this is perhaps best shown in FIG. 11. In connection with the embodiment of FIGS. 15-18, this is perhaps best shown in FIG. 15.

In the embodiments illustrated, the stop wall 88 of the end plate 80 comprises a rigid surface that, when abutted by the adjustable end seal assembly 10, prevents the assembly 10 from expanding away (or further away) from the die body 150. The rigid surface faces toward the die body. In the embodiments of FIGS. 6-14, each end plate 80 has two stop walls 88. In these embodiments, the two stop walls 88 are configured as spaced apart, confronting (e.g., inwardly turned) shoulders, each defining a rigid surface facing toward the die body 150. The adjustable end seal assembly 10, when operatively mounted on the die 100, is carried against the rigid surfaces of these two shoulders. Thus, when the assembly 10 expands, the expansion causes the end seal device 50 to move toward the die 100.

In the embodiment of FIGS. 15-18, each end plate 80 has a single stop wall 88. This stop wall 88 connects the confronting first and second wall sections 82 between which the slot 99 is formed. The stop wall 88 has a rigid surface that, when abutted by the adjustable end seal assembly 10, prevents the assembly 10 from expanding away (or further away) from the die body 150. The rigid surface faces toward the die body. The adjustable end seal assembly 10, when operatively mounted on the die 100, is carried against this rigid surface. Thus, when the assembly 10 expands, the expansion causes the end seal device 50 to move toward the die 100.

In the embodiments of FIGS. 6-14, each end plate 80 comprises spaced-apart first and second rail plate segments 85. In these embodiments, when an adjustable end seal assembly 10 is operatively mounted on the die 100, it is mounted between (e.g., so as to be embraced by) two rail plate segments 85. This is perhaps best shown in FIGS. 6, 7, and 9. In these embodiments, the above-noted slot 900 is a gap between the two rail plate segments 85.

The slot 900 between the two rail plate segments 85 preferably has a configuration matching the shape of the adjustable end seal assembly 10. This is shown, for example, in FIG. 7. In this embodiment, the slot 900 is configured so as to have a trailing region and a leading region, where the leading region is narrower than the trailing region. The trailing region is adjacent to the rear side of the die, and the leading region is adjacent to the front side of the die. The end plate 80 has a stop shoulder 81 against which the adjustable end seal assembly 10 bears when the assembly 10 is moved to its operative position in the slot 900.

The rail plate segments 85 are shown as independent bodies, which are attached separately to the die 100. The first rail plate segment 85 is anchored to a first 125 of the two halves of the die body 150, and the second rail plate segment 85 is anchored to a second 125 of the two halves of the die body. In these embodiments, the first rail plate segment 85 defines the above-noted first wall section 82, and the second rail plate segment 85 defines the above-noted second wall section 82.

In the embodiment of FIGS. 15-18, the die body 150 has an elongated internal passage that opens to the slot 900 of the end plate 80. In this embodiment, the adjustable end seal assembly 10, when operatively mounted on the die 100, has a leading portion (e.g., adjacent to the front of the die) received in the slot 900 of the end plate 80 and a trailing portion (e.g., adjacent to the rear of the die) received in the elongated internal passage of the die body 150. In more detail, the two halves 125 of the die body 150 have mating elongated slots 130 that, when coupled together, form the elongated internal passage in which the trailing portion of the assembly 10 is received. In the present embodiment, the outlet orifice 850 has a shorter lateral length than the die body 150. The die 100 in this embodiment has a projecting front region that defines the two die lips 120. This projecting front region is shown having a generally triangular configuration, which tapers to a narrow front end at the outlet orifice 850. In the present embodiment, this projecting front region has a shorter lateral length than the rear portions of the die body halves 125. In more detail, the die body 150 has two lateral side extensions 127 in which the two adjustable end seal assemblies 10 are respectfully mounted. The internal flow passageway 850 does not pass through these lateral side extensions 127. Rather, the internal flow passageway is located inwardly of (e.g., spaced apart from) the two lateral side extensions 127. This is best shown in FIG. 16.

In the present embodiment, the end plates 80 are located forward of the die's lateral side extensions 127. Each illustrated end plate 80 has an inside wall carried against an end region 159 of the die body 150 and a rear wall carried against a front wall of the adjacent lateral side extension 127. Thus, the slot 900 of the end plate 80 and the adjacent internal passage of the die body 150 collectively form an elongated mount opening (extending between the rear and front sides of the die) in which the adjustable end seal assembly 10 can be mounted.

In the embodiment of FIGS. 15-18, the side member 48/end seal plate 56 is prevented from moving axially together with the drive member 46 by virtue of a cross pin projecting from the end plate 80 and extending through a slot in the side member 48/end seal plate 56. This cross pin, while preventing the side member 48/end seal plate 56 from moving axially, allows it to move laterally toward and away from the die 100 (e.g., in response to the wedging action of the assembly 10) to an extent limited by the length of the slot in the side member 48/end seal plate 56.

The invention also provides methods of using an extrusion die having an adjustable end seal assembly. In one embodiment, the invention provides a method of operating an extrusion die 100 having a die body 150, an internal flow passageway 800, and an adjustable end seal assembly 10 including an end seal device 50. The extrusion die 100 and the adjustable end seal assembly 10 of the present method can be of the nature described above.

The method involves moving the adjustable end seal assembly 10 from a disengaged configuration to an engaged configuration by operating a single actuator 20. As discussed previously, when the adjustable end seal assembly 10 is in the engaged configuration, the end seal device 50 is held forcibly against an end region 159 of the die body 150, and when the adjustable end seal assembly is in the disengaged configuration, the end seal device is either spaced apart from the end region of the die body or held against the end region of the die body with less force than when in the engaged configuration.

The adjustable end seal assembly 10 expands in moving from the disengaged configuration to the engaged configuration. For example, this may involve the end seal device 50 of the adjustable end seal assembly 10 moving from a retracted position to an extended position. Reference is made to FIGS. 12 and 13. The end seal device 50 in FIG. 13 is in a retracted position, while the end seal device 50 in FIG. 12 is in an extended position.

The present method involves operating a single actuator 20 of the adjustable end seal assembly 10. This causes the end seal device 50 to simultaneously apply substantially uniform pressure to multiple points about the end region 159 of the die body 150, thereby sealing a lateral side of the internal flow passageway 800. In the embodiments illustrated, the end seal plate 56 moves in its entirety against the end region 159 of the die body 150 in response to operating the single actuator 20. The actuator 20 preferably is on the rear side of the die 100.

When the adjustable end seal assembly 10 is in the engaged configuration, the end seal device 50 preferably applies a pressure of at least 15,000 psi to the end region 159 of the die body 150. In some cases, the applied pressure is 20,000 psi or more.

The actuator 20 may be operated by rotating an actuator body on the rear side of the extrusion die 100 and thereby forcing an adjustment rod 30 coupled with the actuator body to move axially toward or away from a front side of the extrusion die. This axial movement of the adjustment rod 30 causes a drive member 46 and a side member 48 of the adjustable end seal assembly 10 to move relative to each other. This creates a wedging action that forces the drive member 46 and the side member 48 to move away from each other. The details of the actuator 20 and adjustment rod 30 movements, and the resulting wedging action of the drive member 46 and the side member 48 (and the optional camming members 45), were discussed previously.

Some embodiments of the present method also involve operating the extrusion die 100 such that extrudate flows through the internal flow passageway 800 and alongside the end seal device 50. As noted above, in the embodiments illustrated, extrudate flowing through the internal flow passageway 800 contacts a gasket 58 of the adjustable end seal assembly 10.

Finally, some embodiments of the present method also involve moving the adjustable end seal assembly 10 from the engaged configuration to the disengaged configuration by operating the single actuator 20 of the adjustable end seal assembly 10. In certain embodiments of this nature, a gasket 58 of the adjustable end seal assembly 10 is then received loosely alongside the die body 150. In such embodiments, the method can further involve removing the gasket 58 from the extrusion die 100 by simply pulling the gasket 58 away from a rear side of the extrusion die. Embodiments of this nature were discussed previously in connection with FIG. 14.

While certain preferred embodiments have been described, it should be understood that various changes, adaptations and modifications may be made therein without departing from the spirit of the invention and the scope of the appended claims.

What is claimed is:

1. An extrusion die, comprising:
    a die body having opposed front and rear sides and an end region,
    an internal flow passageway,
    an outlet orifice, on said front side of said die body, and
    an adjustable end seal assembly comprising an end seal device, a wedge mechanism, a gasket, and an actuator,
    said internal flow passageway leading to said outlet orifice,
    said end seal device closing one side of said internal flow passageway such that, when said extrusion die is operated, extrudate flows through said internal flow passageway and alongside said end seal device,
    said adjustable end seal assembly having an engaged configuration and a disengaged configuration, such that when said adjustable end seal assembly is in said engaged configuration, said gasket and said end seal device are held forcibly against said end region of said die body, and when said adjustable end seal assembly is in said disengaged configuration, said gasket and said end seal device are either spaced apart from said end region of said die body or held against said end region of said die body with less force than when in said engaged configuration, such that said gasket is removable from said die body in said disengaged configuration, and said actuator being operable to move said adjustable end seal assembly between said engaged and disengaged configuration by moving said adjustable end seal assembly in an axial direction parallel to said end region of said die body.

2. The extrusion die of claim 1, wherein said gasket positioned between said end region of said die body and said wedge mechanism, such that when said extrusion die is operated, extrudate flows through said internal flow passageway and contacts said gasket.

3. The extrusion die of claim 2, wherein said gasket can be removed from said extrusion die by pulling said gasket away from said rear side of said extrusion die.

4. The extrusion die of claim 1, wherein:
said wedge mechanism comprises both a drive member and a side member,
said adjustable end seal assembly comprises an adjustment bar extending from said actuator on said rear side of said extrusion die to said drive member,
said adjustment bar moves axially in response to operation of said actuator, and
said drive member and said side member move away from each other in response to axial movement of said adjustment bar in a first direction.

5. The extrusion die of claim 4, further comprising:
a plurality of cam members located between said drive member and said side member, said drive member moving in response to axial movement of said adjustment bar,
wherein either said drive member or said side member has a series of angled surfaces that ride on a respective series of said cam members during movement of said drive member relative to said side member,
wherein either said drive member or side member has a series of spaced apart grooves, each of said grooves having a first end and a second end, said second end of each groove being deeper than said first end, such that said angled surfaces are bottoms of said grooves, said cam members being spheres received in respective ones of said grooves.

6. The extrusion die of claim 1, further comprising an end plate mounted to said end region of said die body.

7. The extrusion die of claim 6, wherein said die body comprises two halves between which said internal flow passageway extends.

8. The extrusion die of claim 1, wherein when said end seal device is held forcibly against said end region of said die body, a pressure is applied in a direction perpendicular to the plane in which said end region lies, the pressure being greater when said adjustable end seal assembly is in the engaged configuration than when said adjustable end seal assembly is in the disengaged configuration.

9. The extrusion die of claim 8, wherein the pressure is at least 15,000 psi.

10. The extrusion die of claim 9, wherein the pressure is at least 20,000 psi.

11. The extrusion die of claim 1, wherein said end seal device closes one side of said internal flow passageway without extending into said internal flow passageway.

12. The extrusion die of claim 6, wherein said adjustable end seal assembly is housed in said end plate.

13. The extrusion die of claim 6, wherein said end plate has a stop wall that restrains movement of said adjustable end seal assembly in a direction away from said die body.

14. The extrusion die of claim 7, wherein:
said end plate has a slot in which said adjustable end seal assembly is mounted, said end plate having spaced-apart confronting first and second wall sections between which said slot is located, and
said end plate comprises spaced-apart first and second rail plate segments, said first rail plate segment defining said first wall section and being anchored to a first of said two halves of said die body, said second rail plate segment defining said second wall section and being anchored to a second of said two halves of said die body, said adjustable end seal assembly being mounted between said first and second rail plate segments.

15. The extrusion die of claim 6, wherein:
said end plate has a slot in which said adjustable end seal assembly is mounted, said end plate having spaced-apart confronting first and second wall sections between which said slot is located, and
said die body has an elongated internal passage that opens to said slot of said end plate, said adjustable end seal assembly having a first portion received in said slot of said end plate and having a second portion received in said elongated internal passage of said die body.

* * * * *